US012215840B1

(12) United States Patent
Zheng et al.

(10) Patent No.: US 12,215,840 B1
(45) Date of Patent: Feb. 4, 2025

(54) MULTI-PURPOSE DESK LAMP CAPABLE OF ADJUSTING ILLUMINATION POSITION

(71) Applicants: LIGHTDECO ENTERPRISE LTD., Taipei (TW); FUJIAN OUMEIDA ELECTRIC MACHINE CO., LTD., Fuan (CN)

(72) Inventors: Yao-Fu Zheng, Fuan (CN); Chun-Hui Lin, Taipei (TW)

(73) Assignees: LIGHTDECO ENTERPRISE LTD., Taipei (TW); FUJIAN OUMEIDA ELECTRIC MACHINE CO., LTD., Fuan (CN)

( * ) Notice: Subject to any disclaimer, the term of this patent is extended or adjusted under 35 U.S.C. 154(b) by 0 days.

(21) Appl. No.: 18/742,818

(22) Filed: Jun. 13, 2024

(51) Int. Cl.

| | |
|---|---|
| ***F21V 1/08*** | (2006.01) |
| ***F21S 6/00*** | (2006.01) |
| ***F21V 1/12*** | (2006.01) |
| ***F21V 21/26*** | (2006.01) |
| ***F21V 21/30*** | (2006.01) |
| ***F21V 23/04*** | (2006.01) |

(52) U.S. Cl.
CPC ................ *F21V 1/08* (2013.01); *F21S 6/003* (2013.01); *F21V 1/12* (2013.01); *F21V 21/26* (2013.01); *F21V 21/30* (2013.01); *F21V 23/04* (2013.01)

(58) Field of Classification Search
CPC ........... F21S 6/003; F21S 6/002; F21V 21/06; F21V 21/30; F21V 1/08; F21V 1/12
See application file for complete search history.

(56) References Cited

U.S. PATENT DOCUMENTS

| | | | | |
|---|---|---|---|---|
| 2013/0051025 A1* | 2/2013 | Lai | F21S 6/002 | 362/269 |
| 2021/0254818 A1* | 8/2021 | Liu | F21V 23/04 | |
| 2022/0120393 A1* | 4/2022 | Shao | F21S 6/003 | |
| 2023/0101336 A1* | 3/2023 | Jiang | F21V 21/26 | 362/418 |

FOREIGN PATENT DOCUMENTS

CN 105937719 A * 9/2016 ................ F21S 6/00

OTHER PUBLICATIONS

Machine translation of Huang et al., CN 105937719 A, published Sep. 14, 2016 (Year: 2016).*

* cited by examiner

*Primary Examiner* — William N Harris
(74) *Attorney, Agent, or Firm* — Best & Flanagan LLP

(57) ABSTRACT

A multi-purpose desk lamp capable of adjusting illumination position, comprising a base, a support column connected to the base, a luminous lampshade, a light emitting component inside the luminous lampshade, a pivot structure between the luminous lampshade and the support column, and an open slot on the top surface of the luminous lampshade at a position close to one end. The luminous lampshade can be connected with the pivot structure in a movable manner via a positioning bolt through the open slot. A telescopic sliding structure is provided inside the luminous lampshade. The luminous lampshade can move linearly along the open slot via the telescopic sliding structure or can be tilted upward or downward via the pivot structure, and the positioning bolt can be turned left or right in relation to the pivot structure, to change the illumination position of the luminous lampshade.

1 Claim, 10 Drawing Sheets

MULTI-PURPOSE DESK LAMP CAPABLE OF ADJUSTING ILLUMINATION POSITION

BACKGROUND OF THE INVENTION

The present invention relates to a structure improvement of a desk lamp, and more particularly to a desk lamp capable of being adjusted to change a variety of illumination positions, thereby greatly enhancing usability.

DESCRIPTION OF THE RELATED ART

Desk lamp is a general electric appliance and is commonly used in home life, office or learning environments. The structure of a conventional desk lamp usually has a base, wherein the base can be square, round, or in any form of shape, namely the form is not restricted but the stability is required. The center of the top of the base is usually connected with a support column rising upward at an inclined angle, and a flexible pivot structure is commonly used for the connection between the support column and the base, thereby adjusting the rising inclination and position of the support column corresponding to the base. The support column can be only one piece rising upward, but more commonly, the support column is composed of an upper support column and a lower support column connected to each other, and a flexible pivot structure is commonly used for the connection between the top end of the lower support column and the bottom end of the lower support column, thereby more flexibly adjusting the rising position of the top end of the support column. The top end of the support column is connected to a luminous lampshade, wherein a light emitting component is configured inside the luminous lampshade and a flexible pivot structure is commonly used between the luminous lampshade and the support column, and therefore, the top end of the support column is used as the pivot point, thereby enabling the luminous lampshade to be flipped to further deflect. However, it is limited by an assembly relationship between each component. The deflection action is necessarily proceeded within a certain angle so the adjustment and change of illumination positions are also limited.

A conventional desk lamp having a light emitting component configured inside the luminous lampshade sheds light downward or diagonally below, thereby achieving the desired function of the desk lamp. However, as mentioned above, due to the limitations of the assembly relationship between different components of the convention desk lamp, the angle of the luminous lampshade in relation to the support column capable of being flipped to deflect is subject to a great restriction and only allowed to deflect within a micro angle, so the illumination position of the conventional desk lamp capable of being adjusted and changed is limited to further cause a limited usability.

SUMMARY OF THE INVENTION

In view of the drawback of prior-art desk lamps that the illumination position cannot be adjusted in a wide range and their usage is subject to great limitation, the inventor of the present invention made great effort in seeking solutions for improvement, which led to the present invention.

Therefore, the primary objective of the present invention is to provide a desk lamp which can be adjusted manually to be multiple illumination positions, thereby greatly enhancing the usability.

To achieve the above-mentioned objective, the present invention is to provide a multi-purpose desk lamp capable of adjusting illumination position, comprising a base, a support column, a luminous lampshade and a light emitting component, wherein, at least one press button is configured on the surface of the base; the bottom end of the support column is flexibly connected with the top of the base through a movable disk; the luminous lampshade is flexibly connected with the top end of the support column through a pivot structure, the luminous lampshade comprises a top shell and a bottom cover box, the top shell has a hollow bottom with a plurality of clamping slots disposed on the inner edge of two sides of the bottom, the inner space of the top shell is configured with a plurality of long hole columns extending downward; the bottom cover box and the top shell are corresponding to each other, the outer edges of two sides of the bottom of the bottom cover box are configured with a plurality of tenons, the tenons are configured correspondingly to the clamping slots, a space is defined by a peripheral wall near to the outer edge of the top of the bottom cover box, the top surface is disposed with the assembly holes corresponding to the long hole columns, when the top shell covers the bottom cover box, the long hole columns of the top shell one by one correspond to the assembly holes of the bottom cover box and further connects with the long hole columns via the assembly components passing through the assembly holes, and meanwhile, the clamping slots of the top shell are correspondingly engaged with the tenons of the bottom cover box, the light emitting component is configured inside the inner space of the bottom cover box, the light emitting component is controlled by the press button to light up, light out or adjust a variety of lighting modes; the inner bottom of the bottom cover box is configured with a grille to enhance the light gentleness and an anti-glare function, characterized in that: an open slot is disposed on the top surface of the top shell closed toward one end, a short hole column is respectively disposed inside the inner space of the top shell closed toward the open slot and on the middle section, the luminous lampshade has a telescopic sliding structure, comprising a positioning seat, an upper-layer frame, a lower-layer frame, a buffer frame and a lower positioning plate, wherein the positioning seat is designed as a three-dimensional frame with the left and right sides communicating with each other, a bottom extends toward left and right sides to form a panel with a larger area, a big through-hole is disposed on the center of the bottom, a small through-hole is disposed on the top surface, the panel formed by extending the bottom toward left and right sides is disposed with a plurality of assembly holes, the entire positioning seat can pass through the big through hole from down to up via a positioning bolt, then through the small through-hole, and further through the open slot of the top shell, thereby securely connecting with the positioning bolt by a stop nut to enable the positioning seat to be suspended under the open slot of the top shell; the plate body of the lower positioning plate is disposed with a plurality of assembly holes, the front and rear sides extend upward to form S-shaped side walls, when assembled, the lower positioning plate penetrates and reaches inside the positioning seat and horizontally rests on the panel formed by extending the bottom of the positioning seat toward left and right sides, and then to be secured via an assembly component passing through the assembly hole of the positioning seat and the assembly hole of the lower positioning plate, thereby enabling the lower positioning plate to be rested horizontally on the bottom of the positioning seat; the buffer frame is a cover shape having a hollow bottom and the front and rear sides extend vertically downward to form the side walls, the side walls are disposed with a series of buffer holes, the buffer frame is longer than the lower positioning plate, when assembled, the buffer frame penetrates and rests inside the positioning seat and covers the lower positioning plate, thereby enabling the top ends of the S-shaped side walls on two sides of the lower positioning plate to be respectively pressed into the top edge inside the side walls on two sides of the buffer frame to form a state that the lower positioning plate supports the buffer frame, so that the buffer frame can slide left and right in relation to the lower positioning plate; the lower-layer frame is a cover shape having a hollow bottom and the front and rear sides extend vertically downward to form S-shaped side walls, one side extends vertically downward to form a limiting wall, an assembly hole is respectively disposed on the plate surface of the lower-layer frame at a position close to the two ends, the lower-layer frame is longer than the buffer frame, when assembled, the lower-layer frame penetrates and rests inside the positioning seat and covers the buffer frame, thereby enabling the top edges of the side walls on two sides of the buffer frame to be respectively pressed into the top edges inside the S-shaped side walls on two sides of the lower-layer frame to form a state that the buffer frame supports the lower-layer frame; the middle-layer frame is a cover shape having the hollow left and right sides and bottom, the front and rear sides extend vertically downward to form the side walls, the plate surface of the middle-layer frame is provided with an inner assembly hole and an outer assemble hole at a position close to the two ends, the middle-layer frame is longer than the lower-layer frame, when assembled, the middle-layer frame penetrates and rests inside the positioning seat and covers the lower-layer frame, and then pass through the inner assembly hole of the middle-layer frame and the assembly hole of the lower-layer frame via the assembly component to be secured, thereby enabling the S-shaped side wall of the lower-layer frame to be against the inner surface of the side wall of the middle-layer frame; the upper-layer frame is a cover shape having the hollow left and right sides and a hollow bottom, the front and rear sides extends vertically downward to form the side walls, an inner assembly hole is respectively disposed on the plate surface of the upper-layer frame at a position close to the two ends, a length of the upper-layer frame same with the middle-layer frame, the upper-layer frame penetrates and rests inside the positioning seat and covers the middle-layer frame and then extends upward to corresponding secure with the short hole column inside the top shell via the assembly component passing through the outer assembly hole of the middle-layer me and the assembly hole of the upper-layer frame, thereby enabling the middle-layer frame and the upper-layer frame to be jointed with the top shell.

The above-mentioned multi-purpose desk lamp capable of adjusting illumination position is used via a motion of pushing the luminous lampshade to move linearly along the open slot matching with a motion of upward or downward self-deflection of the pivot structure and a motion of the positioning bolt turning left and right in relation to the pivot structure, and the match and operation of the above three motions enable to adjust and change the illumination position of the luminous lampshade meet multiple purposes.

DETAILED DESCRIPTION OF EMBODIMENTS OF THE INVENTION

For better understanding of the technical means adopted to accomplish the above object of the present invention as well as the efficacy of the invention, the following preferred embodiment is used as an example for detailed explanation and description of the invention with reference to the accompanying drawings.

Figure 1:
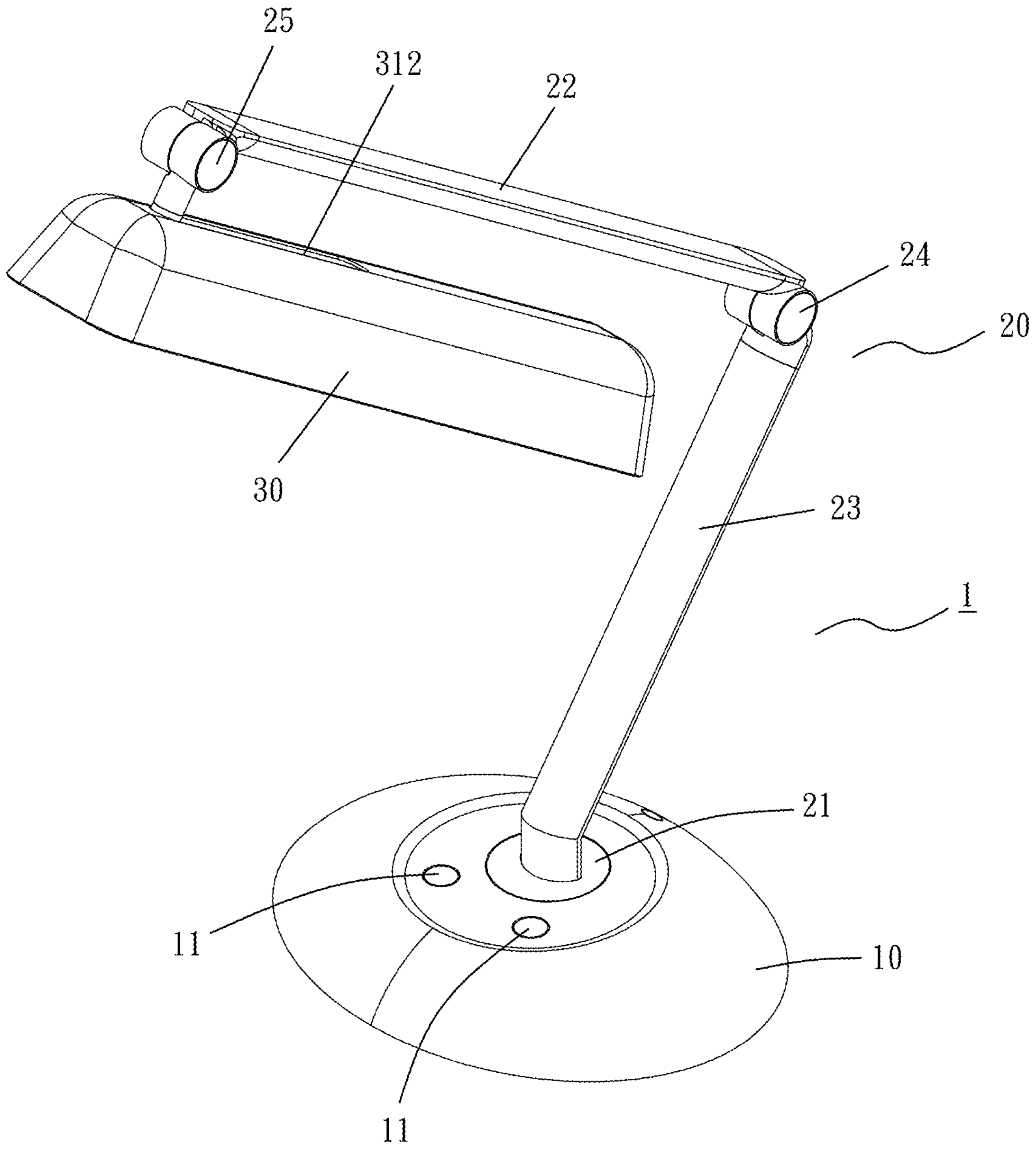
FIG. 1 is a perspective view of an embodiment of the present invention.
Figure 2:
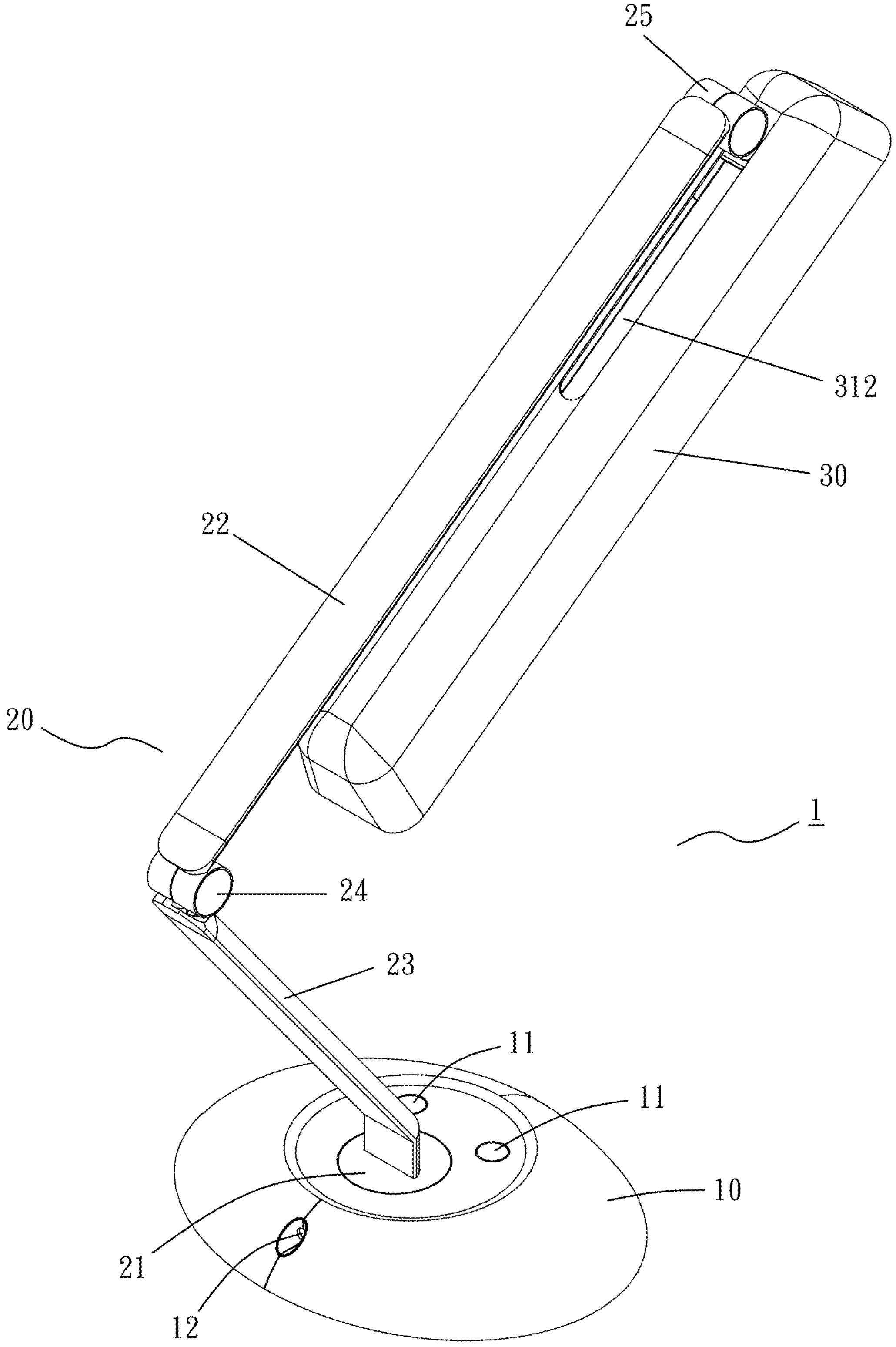
FIG. 2 is a perspective view of an embodiment of the present invention from a different viewing angle.
Figure 3:
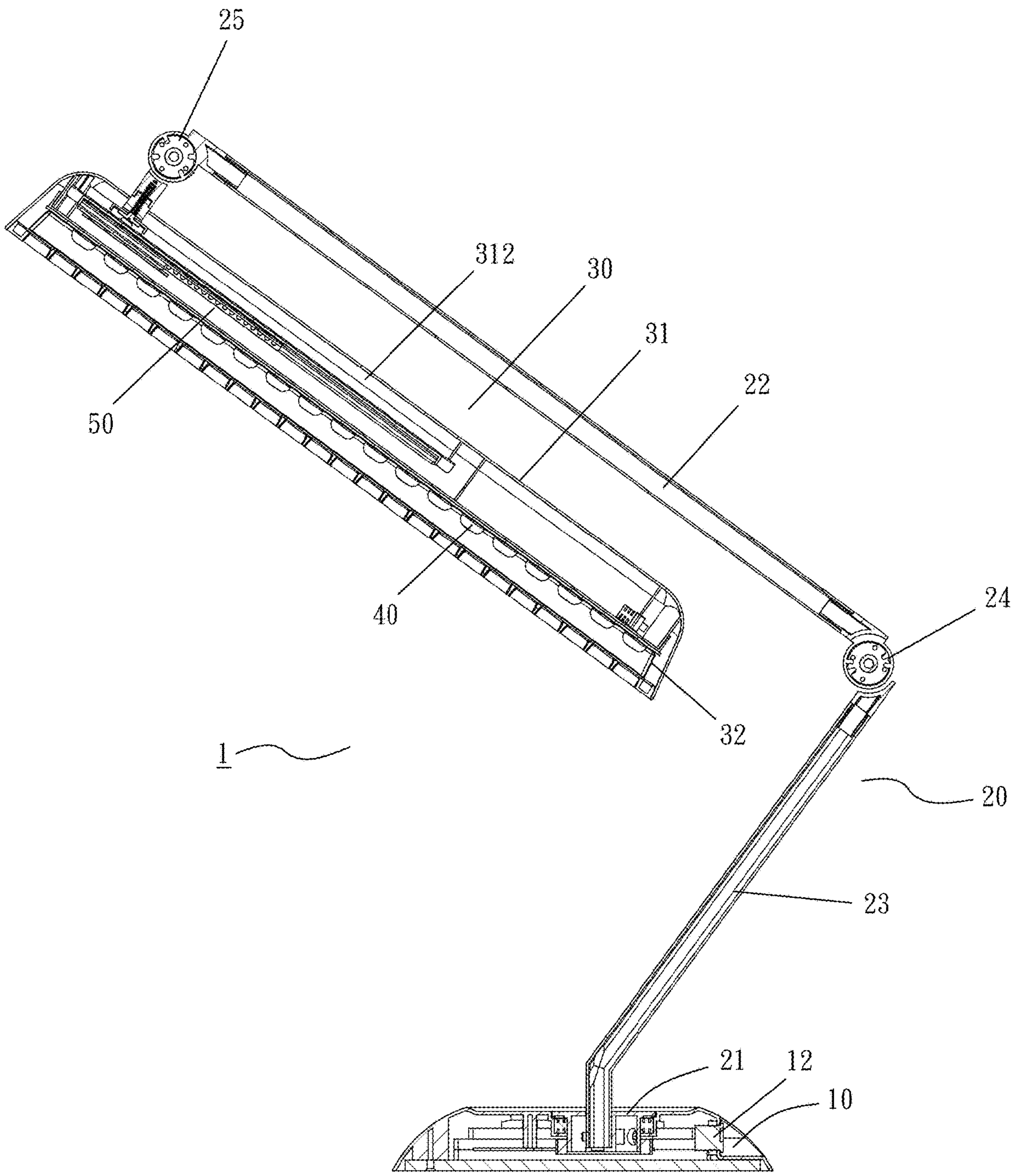
FIG. 3 is a longitudinal sectional view of an embodiment of the present invention.
Figure 4:
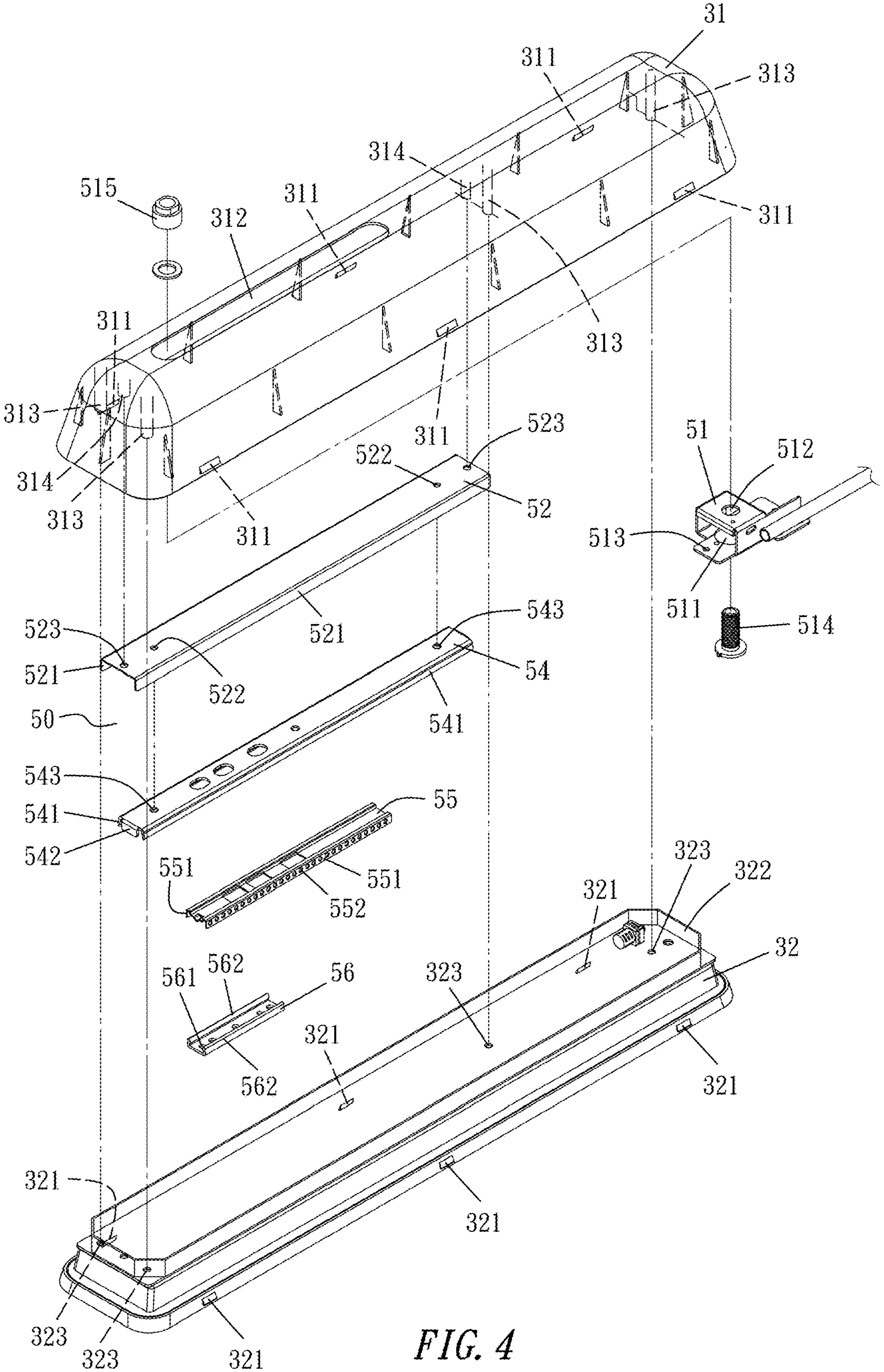
FIG. 4 is an exploded perspective view of the luminous lampshade and the telescopic sliding structure in an embodiment of the present invention.
Figure 5:
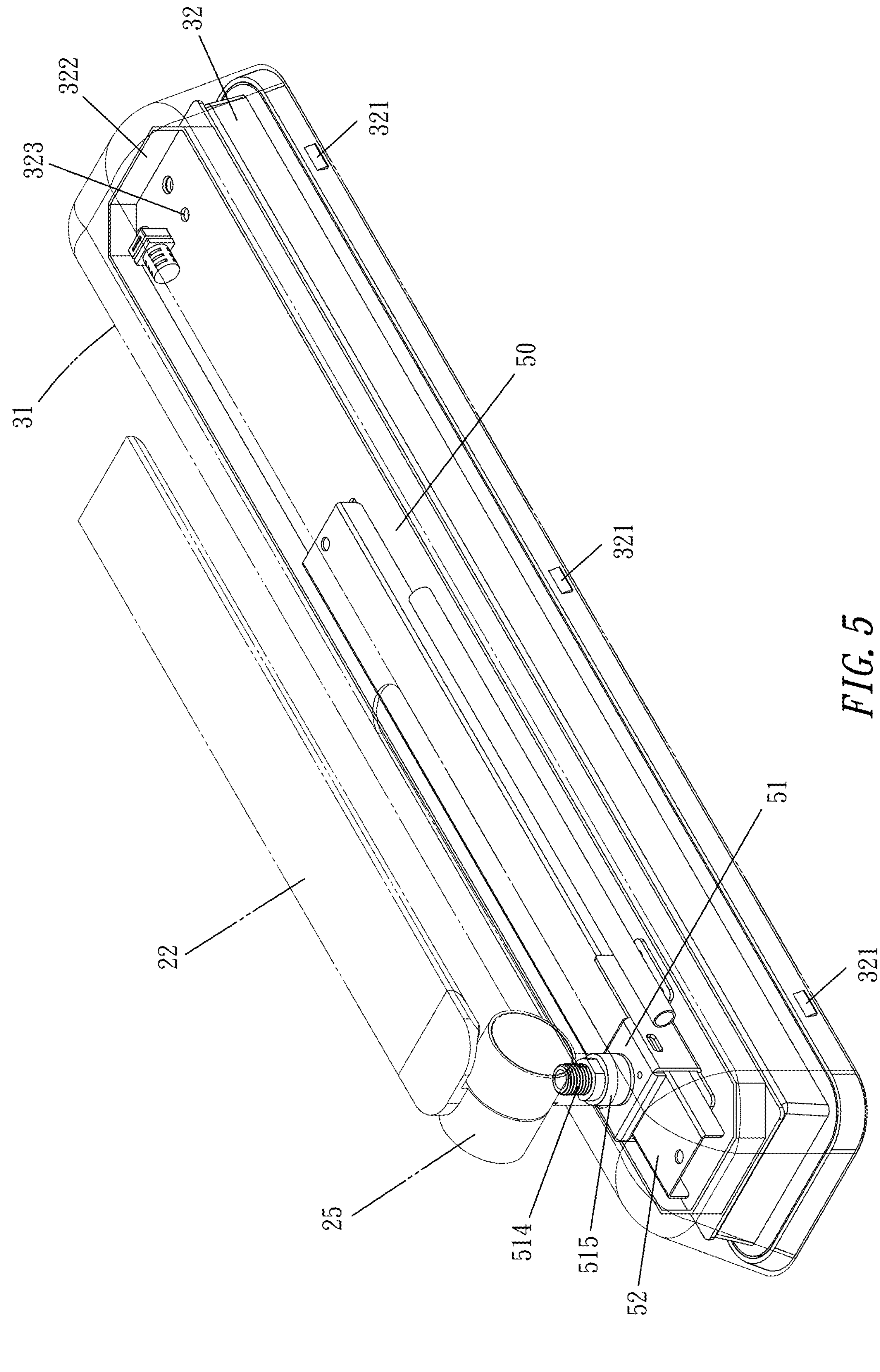
FIG. 5 is a perspective view of the luminous lampshade and the telescopic sliding structure in an embodiment of the present invention.
Figure 6:
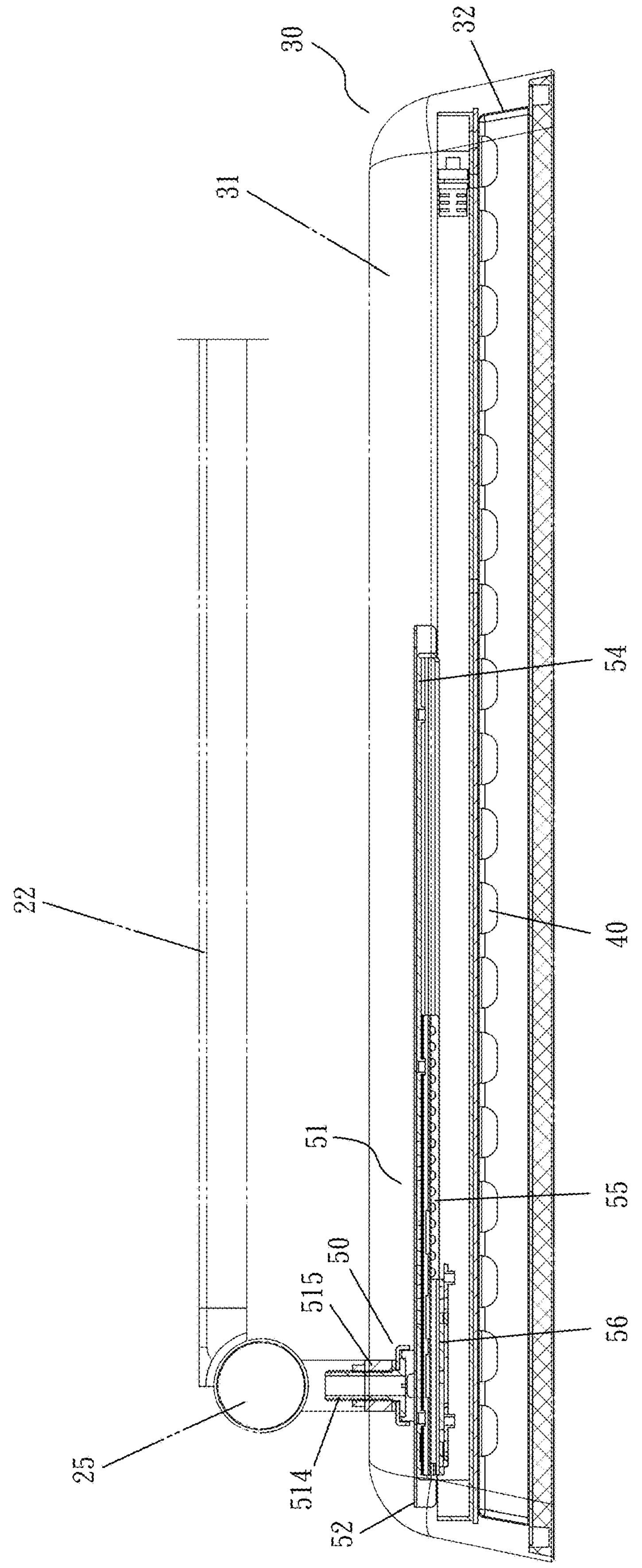
FIG. 6 is a longitudinal sectional view of the luminous lampshade and the telescopic sliding structure in an embodiment of the present invention.
Figure 7:
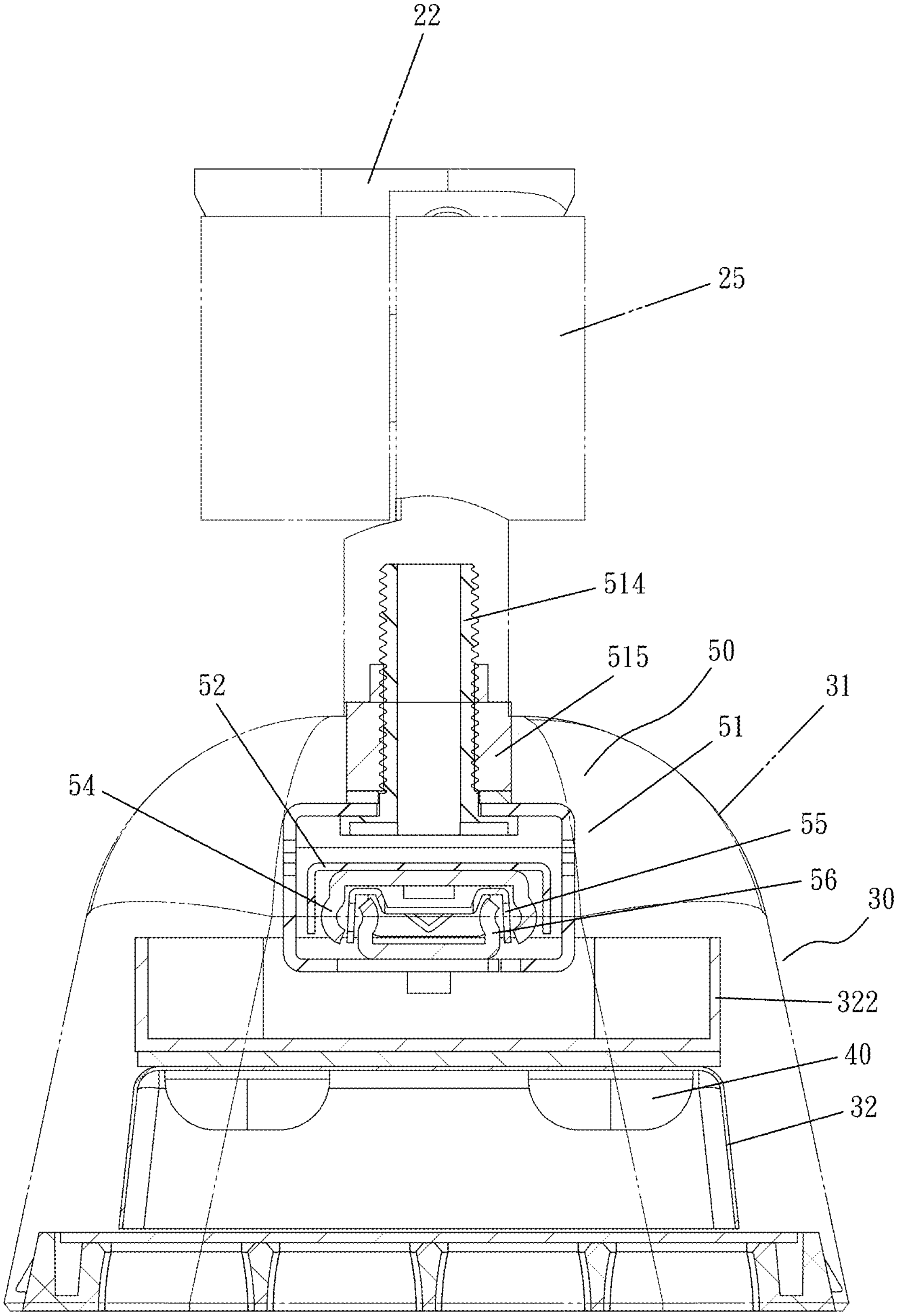
FIG. 7 is a transverse sectional view of the luminous lampshade and the telescopic sliding structure in an embodiment of the present invention.

With reference to FIGS. 1 to 3, the invention is related to a desk lamp 1, basically comprising a base 10, a support column 20, a luminous lampshade 30 and a light emitting component 40, and wherein, the base 10 can be any shape, as long as it can stably stand on the desktop, at least one press button 11, such as being a push button or touch button or a thin film button, is disposed on the surface of the base 10, the button 11 is communicated with the light emitting component 40 to control the on-off modes or adjust the varied illuminating modes of the light emitting component 40, the indication of "- - - setting at least one button 11 - - - " shows the number of buttons 11 can be one, probably two or more, mainly based on the need of "- - - control or adjust the light emitting component 40 - - - " to set, a socket 12 is disposed on the surface of the base 10 to plug in a low-voltage output terminal of an adapter; the bottom end of the support column 20 is flexibly connected to the top of the base 10 at a position near the center through a movable disk 21, thus the support column 20 can be turned without moving the base 10, the support column 20 can also be made up of an upper support column 22 and a lower support column 23 connected to each other, the movable disk 21 is located on the bottom end of the lower support column 23, and the top end of the lower support column 23 is flexibly connected with the bottom end of the upper support column 22 through a pivot structure 24, thus, with the pivot structure 24 as the pivot point, the upper support column 22 can be pulled and turned within a specific angular range, without moving the lower support column 23, so as to adjust the level of the luminous lampshade 30, the pivot structure 24 itself has a mechanism to limit the turning angle so that the tilted angle of the upper support column 22 can be limited to avoid off balance and topple of the whole desk lamp 1; of course, the support column 20 is not necessarily made up of the upper support column 22 and the lower support column 23 (i.e., the number is two), the number can be one or more than two; the luminous lampshade 30 is in the shape of a long shell, flexibly connected with the top end of the support column 20 (i.e., the upper support column 22) through a pivot structure 25, thus, without moving the support column 20 (i.e., the upper support column 22), with the pivot structure 25 as the pivot point, the luminous lampshade 30 can be pulled to turn within a specific angular range so that the level of the luminous lampshade 30 can be adjusted, of course, the pivot structure 25 also has a mechanism to limit the turning angle, so as to limit the turning angle of the luminous lampshade 30 to avoid collision of the luminous lampshade 30 and the support column 20 to affect the overall aesthetic appeal; the light emitting component 40 is disposed inside the inner space of the luminous lampshade 30 in the shape of a long shell, the light emitting component 40 is powered by an appropriately rated voltage converted from commercial electricity, and is controlled by the button 11 to light up, extinguish, or to adjust multiple illuminating modes, such as: full on (reading time), half on (leisure time), slight glow (when sitting quietly) etc.; the inner bottom of the luminous lampshade 30 is disposed with a grille for enhanced gentleness of the light and for an anti-glare function.

With reference to FIGS. 4 to 7, the luminous lampshade 30 comprises a top shell 31 and a bottom cover box 32, wherein, the top shell 31 is in the shape of a shell with a hollow bottom, a plurality of clamping slots 311 are disposed on the inner edge of the bottom on two sides, an open slot 312 is disposed on the top surface at a position closer to one end, the length of the open slot 312 is less than half of the length of the top shell 31, two long hole columns 313 and a short hole column 314 are disposed inside the inner space of the top shell 31 at the end near the open slot 312, a long hole column 313 and a short hole column 314 are disposed on the middle section, and a long hole column 313 is disposed on the end away from the clamping slot 311; the bottom cover box 32 is in the shape of a long box, the light emitting component 40 is mounted inside it, and its bottom is disposed with a grille (see FIG. 6), a plurality of tenons 321 are disposed on the outer edge of the bottom of the bottom cover box 32 on two sides, the tenons 321 are disposed at positions corresponding to the aforementioned clamping slots 311, a space is defined by a peripheral wall 322 close to the outer edge of the top surface of the bottom cover box 32, the top surface is disposed with assembly holes 323 to match the aforementioned long hole columns 313, thus, when the top shell 31 covers the top surface of the bottom cover box 32, the long hole columns 313 of the top shell 31 will be one by one aligned with the assembly holes 323 of the bottom cover box 32, and assembly components like bolts (not shown in the figure) can go through the assembly holes 323 to be locked with the long hole column 313, meanwhile, the clamping slots 311 of the top shell 31 are also one by one corresponding to the tenons 321 of the bottom cover box 32, under a force, the clamping slots 311 will be locked with the tenons 321 to accomplish a stable connection. Now, the bottom cover box 32 is hidden inside the top shell 31.

The desk lamp 1 comprising the base 10, the support column 20, the luminous lampshade 30 and the light emitting component 40 is still not an innovation. The innovative feature of the present invention lies in a telescopic sliding structure 50 disposed inside the luminous lampshade 30 of the present invention. The telescopic sliding structure 50 comprises a positioning seat 51, an upper-layer frame 52, a lower-layer frame 54, a buffer frame 55 and a lower positioning plate 56. The positioning seat 51 is mainly designed as a three-dimensional frame, with the left side and right side communicating with each other, the bottom surface extending left and right to form a panel of a larger area, the center of the bottom surface disposed with a big through-hole 511, the top surface disposed with a small through-hole 512, the panel formed by extending the bottom surface left and right is disposed with a plurality of assembly holes 513, the positioning seat 51 can be firmly locked by putting a positioning bolt 514 upward through the big through-hole 511, then through the small through-hole 512, then further through the open slot 312 of the top shell 31 to fix with a jam nut 515 and the positioning bolt 514, so that the positioning seat 51 is suspended under the open slot 312 of the top shell 31.

The lower positioning plate 56 is disposed with a plurality of assembly holes 561, and the front and rear sides extends upward to form an S-shaped side wall 562. When assembled, the lower positioning plate 56 is put into the positioning seat 51, and horizontally placed on the panel formed by extending the positioning seat 51 left and right. Then, an assembly component such as a flush headed bolt (not shown in the figure) is put through the assembly hole 513 and the assembly hole 561 to lock the lower positioning plate 56 horizontally on the bottom surface of the positioning seat 51.

The buffer frame 55 is in the shape of a hood with a hollow bottom, and its front and rear sides extends vertically downward to form side walls 551. The side wall 551 is disposed with a series of buffer holes 552. The buffer frame 55 is longer than the lower positioning plate 56. When assembled, the buffer frame 55 is put into the positioning seat 51 and covers the lower positioning plate 56, the top ends of the S-shaped side walls 562 on two sides of the lower positioning plate 56 are respectively pressed into the top edges of the side walls 551 on the two sides of the buffer frame 55, so that the lower positioning plate 56 supports the buffer frame 55, and the buffer frame 55 can slide left and right in relation to the lower positioning plate 56.

The lower-layer frame 54 is in the shape of a hood with a hollow bottom, with its front and rear sides extending vertically downward to form S-shaped side walls 541, and one lateral side extending vertically downward to form a limiting wall 542. An assembly hole 543 is respectively disposed on the plate surface of the lower-layer frame 54 at positions close to the two ends. The lower-layer frame 54 is longer than the buffer frame 55. When assembled, the lower-layer frame 54 is put into the positioning seat 51 and covers the buffer frame 55. The top edges outside the side walls 551 on two sides of the buffer frame 55 are respectively pressed into the top edges of the S-shaped side walls 541 on two sides of the lower-layer frame 54, so that the buffer frame 55 supports the lower-layer frame 54.

The upper-layer frame 52 is in the shape of a hood, with hollow left and right sides, and a hollow bottom. Its front and rear sides extend vertically downward to form side walls 521. An inner assembly hole 522 and an outer assembly hole 523 are respectively disposed on the plate surface of the upper-layer frame 52 at positions close to the two ends. The upper-layer frame 52 is slightly longer than the lower-layer frame 54. When assembled, the upper-layer frame 52 is put into the positioning seat 51 and covers the lower-layer frame 54. It can be locked by putting an assembly component such as a flush headed bolt (not shown in the figure) through the inner assembly hole 522 of the upper-layer frame 52 and the assembly hole 543 of the lower-layer frame 54. Meanwhile, an assembly component such as a bolt (not shown in the figure) can be put upward through outer assembly hole 523 of the upper-layer frame 52 to be locked with the short hole column 314 inside the top shell 31. In this way, the upper-layer frame 52 and the top shell 31 can be locked together.

Based on the above structure, after going through the open slot 312, the positioning bolt 514 is locked by a jam nut 515, so that the positioning seat 51 is suspended under the open slot 312 of the top shell 31. Then, after the top section of the positioning bolt 514 is locked with the pivot structure 25, as shown in FIG. 3, the top shell 31 is suspended under the pivot structure 25. Meanwhile, the lower positioning plate 56, buffer frame 55, lower-layer frame 54, and upper-layer frame 52 are sequentially put into the positioning seat 51. After the above locking operation, the telescopic sliding structure 50 is formed under the open slot 312 of the top shell 31.

When used, the base 10 and the support column 20 are regarded as in a relatively resting state. The positioning bolt 514, the positioning seat 51, and the lower positioning plate 56 are also in a relatively resting state. Then, when the luminous lampshade 30 is pushed, the open slot 312 on the luminous lampshade 30 will move linearly along the positioning bolt 514, and together, the lower-layer frame 54 and the upper-layer frame 52 will also move linearly to change the position of the luminous lampshade 30 in relation to the pivot structure 25. In this way, the illumination position of the luminous lampshade 30 can be adjusted.

Figure 9:
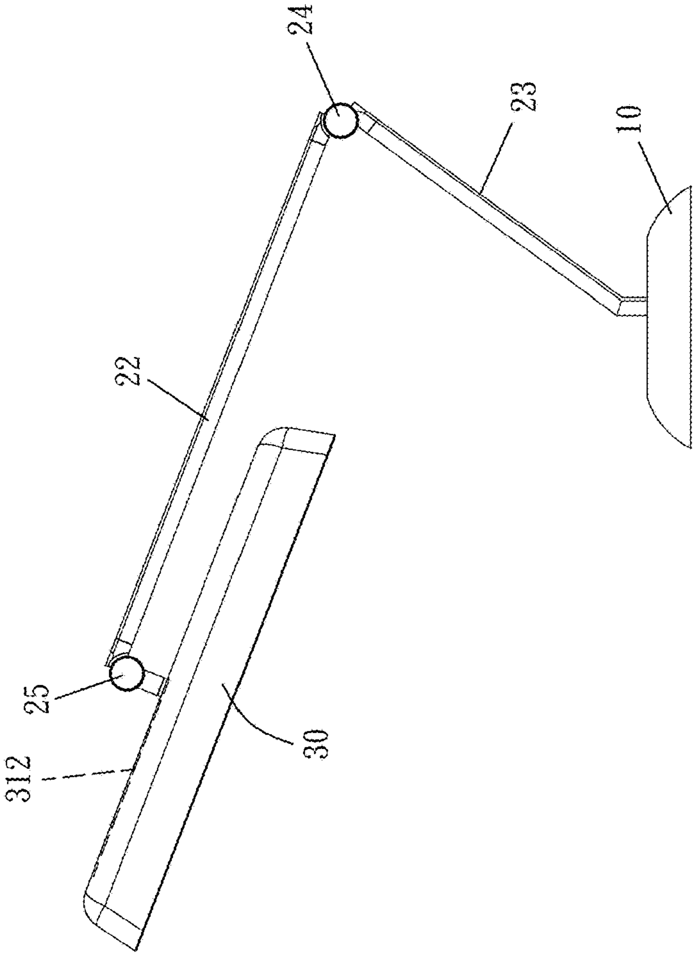
FIG. 8~FIG. 12 are operating state views of an embodiment of the present invention showing adjustment and change of the luminous lampshade for different illumination positions.
Figure 8:
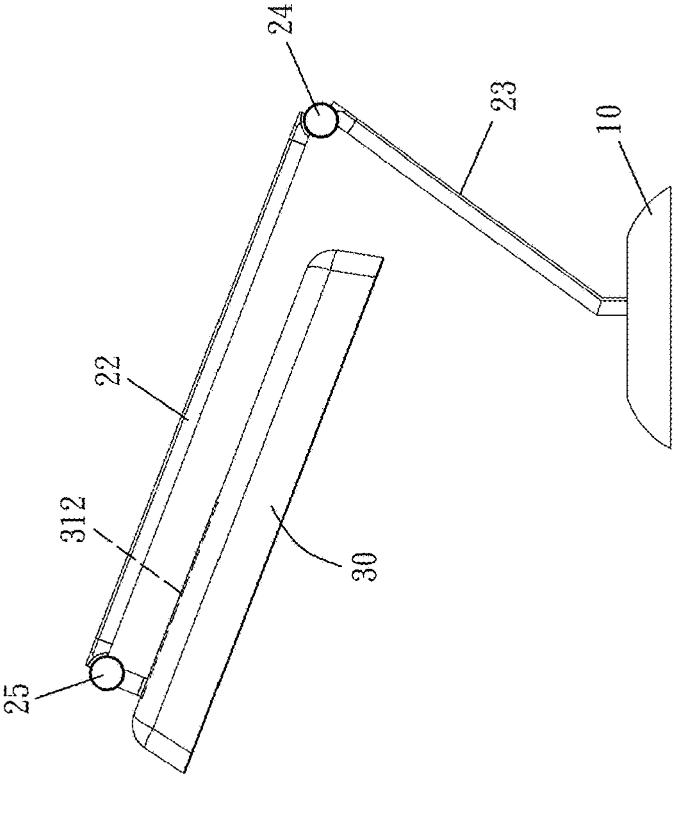

FIG. 8 depicts a state when the leftmost end of the open slot 312 of the luminous lampshade 30 touches the jam nut 515, i.e., the luminous lampshade 30 is moved to the rightmost. The state shown in FIG. 8 is also the state shown in FIG. 3, FIG. 5, and FIG. 6. FIG. 9 depicts a state when the rightmost end of the open slot 312 of the luminous lampshade 30 touches the jam nut 515, i.e., the luminous lampshade 30 is moved to the leftmost. When the state shown in FIG. 8 is changed to the state shown in FIG. 9, firstly, the luminous lampshade 30 will drive the upper-layer frame 52 and the lower-layer frame 54 to move simultaneously toward the left. Because the positioning seat 51 and the lower positioning plate 56 are at a resting position, when the buffer frame 55 is pushed by the lower-layer frame 54, it will slide freely and slowly toward the left along the lower positioning plate 56, acting like a support and buffer component between the lower-layer frame 54 and the lower positioning plate 56, so that the luminous lampshade 30 can drive the upper-layer frame 52 and the lower-layer frame 54 to slide together more flexibly. Then, when the luminous lampshade 30 is pushed and the upper-layer frame 52 and the lower-layer frame 54 are driven to slide in the opposite direction, the buffer frame 55 will likewise slide freely and slowly toward the right along the lower positioning plate 56, so that the luminous lampshade 30 can move smoothly back to its original position, as shown in FIG. 8.

Figure 11:
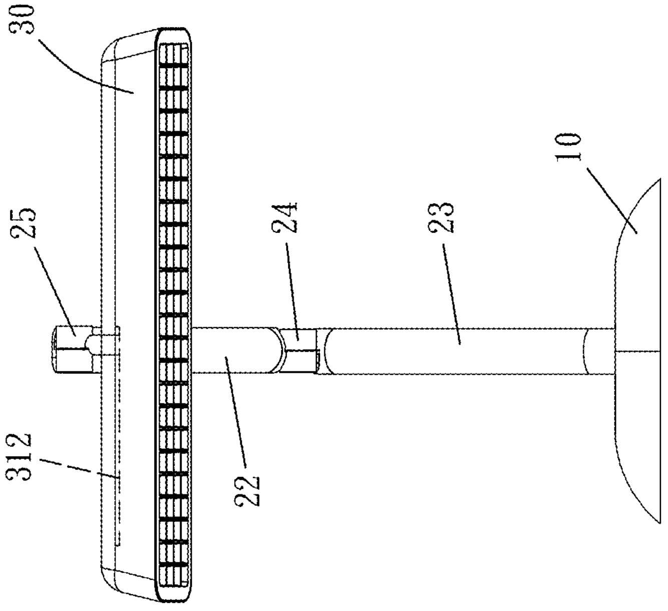
Figure 10:
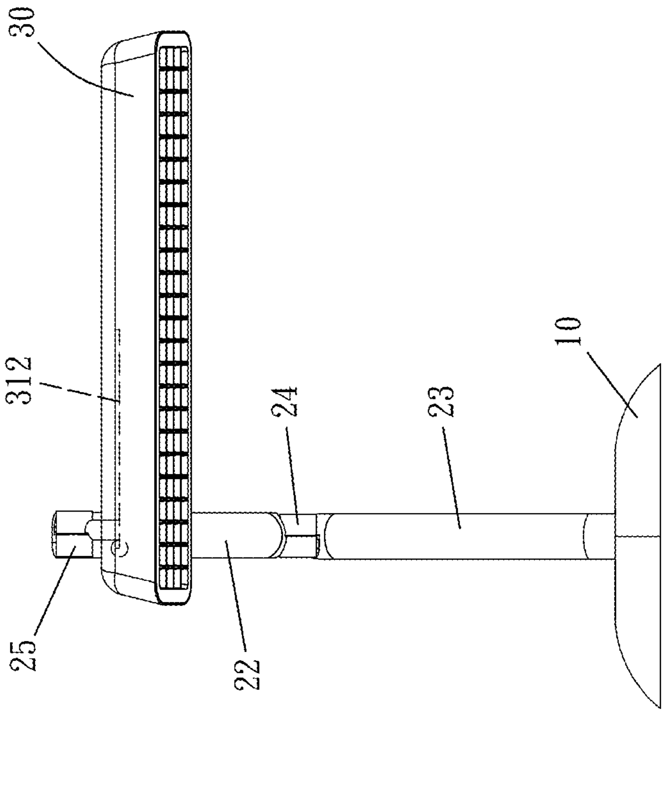
Figure 12:
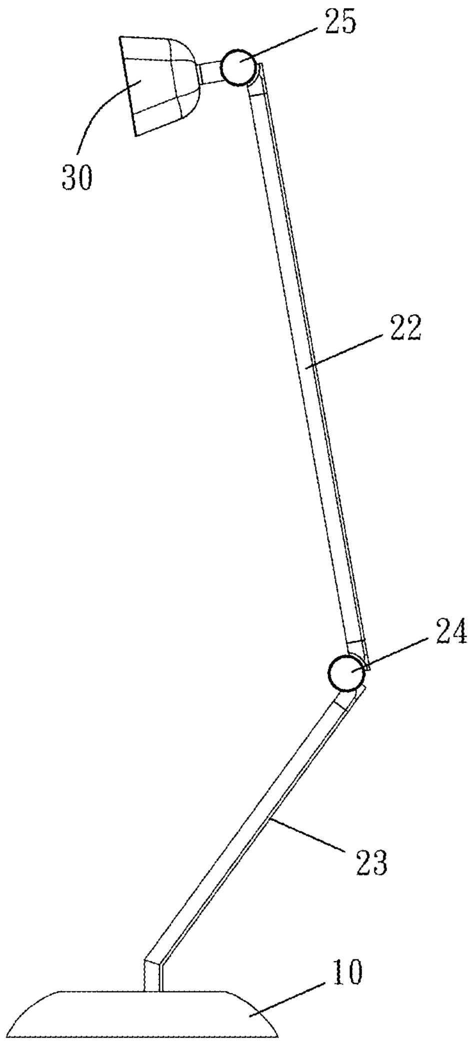

By comparing FIG. 8 and FIG. 9, it is clear that, when the base 10 and the support column 20 are regarded as the base point at rest, the luminous lampshade 30 has changed its illumination position. In the state shown in FIG. 8, the luminous lampshade 30 can be turned in relation to the pivot structure 25 for 90 degrees, to a state as shown in FIG. 10. Now, the luminous lampshade 30 is positioned on the rightmost. Then, the luminous lampshade 30 can be pushed to move left and reach the state shown in FIG. 11, i.e., the luminous lampshade 30 is positioned on the leftmost. In addition, as shown in FIG. 12, the upper support column 22 can also be turned upward to increase the extension height, so that the luminous lampshade 30 is positioned at the highest position to illuminate laterally. Such possible variations are all covered by the scope of the present invention.

As described above, when using the present invention, the luminous lampshade 30 can be pushed to move linearly along the open slot 312, the pivot structure 25 itself can be turned upward or downward, and the positioning bolt 514 can be turned left or right in relation to the pivot structure 25. Through the above three movements, the illumination position of the luminous lampshade 30 can be adjusted and changed to meet different purposes.

Although the invention has been explained in relation to its preferred embodiment, it is to be understood that many other possible modifications and variations can be made without departing from the spirit and scope of the invention as hereinafter claimed.

What is claimed:

1. A multi-purpose desk lamp capable of adjusting illumination position, comprising a base, a support column, a luminous lampshade and a light emitting component, wherein, at least one press button being configured on a surface of the base;

a bottom end of the support column being flexibly connected with a top of the base through a movable disk;

the luminous lampshade being flexibly connected with a top end of the support column through a pivot structure, the luminous lampshade being composed of a top shell and a bottom cover box, wherein the top shell having a hollow bottom with a plurality of clamping slots disposed on inner edges of two sides of the hollow bottom, and an inner space of the top shell being configured with a plurality of long hole columns extending downward;

the bottom cover box and the top shell corresponding to each other, outer edges of two sides of a bottom of the bottom cover box being configured with a plurality of tenons, wherein the tenons being configured correspondingly to the clamping slots, a space defined by a peripheral wall near to an outer edge of a top surface of the bottom cover box, the top surface disposed with assembly holes corresponding to the long hole columns, when the top shell covers the bottom cover box, the long hole columns of the top shell one by one correspond to the assembly holes of the bottom cover box and further connect with the long hole columns via assembly components passing through the assembly holes, and meanwhile, the clamping slots of the top shell being correspondingly engaged with the tenons of the bottom cover box, the light emitting component being configured inside an inner space of the bottom cover box, the light emitting component being controlled by the at least one press button to light up, light out or adjust a variety of lighting modes;

an inner bottom of the bottom cover box being configured with a grille to enhance a light gentleness and an anti-glare function, wherein an open slot disposed on a top surface of the top shell is closed toward one end, a short hole column respectively disposed inside the inner space of the top shell is closed toward the open slot and on a middle section;

the luminous lampshade having a telescopic sliding structure, comprising a positioning seat, an upper-layer frame, a lower-layer frame, a buffer frame and a lower positioning plate, wherein, the positioning seat being designed as a three-dimensional frame with left and right sides communicating with each other, a bottom extending toward the left and right sides to form a panel with a larger area, a big through-hole being disposed on a center of the bottom, a small through-hole being disposed on a top surface, the panel formed by extending the bottom toward the left and right sides which are disposed with a plurality of assembly holes, a positioning bolt passing through the entire positioning seat through the big through-hole from down to up, then through the small through-hole, and further through the open slot of the top shell, thereby securely connecting with the positioning bolt by a stop nut to enable the positioning seat to be suspended under the open slot of the top shell;

a plate body of the lower positioning plate being disposed with a plurality of assembly holes, and front and rear sides extending upward to form a S-shaped side wall, when assembled, the lower positioning plate penetrating and reaching inside the positioning seat and horizontally resting on the panel formed by extending the bottom of the positioning seat toward left and right sides, and then to be secured via an assembly component passing through the assembly hole of the positioning seat and the assembly hole of the lower positioning plate, thereby enabling the lower positioning plate to be rested horizontally on the bottom of the positioning seat;

the buffer frame being a cover shape having a hollow bottom and front and rear sides extending vertically downward to form side walls, the side walls being disposed with a series of buffer holes, the buffer frame being longer than the lower positioning plate, when assembled, the buffer frame penetrating and resting inside the positioning seat and covering the lower positioning plate, thereby enabling top ends of the S-shaped side walls on two sides of the lower positioning plate to be respectively against a top edge inside the side walls on two sides of the buffer frame to form a state in which the lower positioning plate supports the buffer frame, so that the buffer frame is capable of sliding left and right in relation to the lower positioning plate;

the lower-layer frame being a cover shape having a hollow bottom and front and rear sides extending vertically downward to form a S-shaped side wall, one side extending vertically downward to form a limiting wall, an assembly hole being respectively disposed on a plate surface of the lower-layer frame at a position close to two ends thereof, the lower-layer frame being longer than the buffer frame, when assembled, the lower-layer frame penetrating and resting inside the positioning seat and covering the buffer frame, thereby enabling the top edges of the side walls on two sides of the buffer frame to be respectively against the top edges inside the S-shaped side walls on two sides of the lower-layer frame to form a state in which the buffer frame supports the lower-layer frame; and the upper-layer frame being a cover shape having hollow left and right sides and a hollow bottom, the front and rear sides thereof extending vertically downward to form side walls, an inner assembly hole and an outer assembly hole being respectively disposed on a plate surface of the upper-layer frame at a position close to two ends thereof, the upper-layer frame being longer than the lower-layer frame, when assembled, the upper-layer frame penetrating and resting inside the positioning seat and covering the lower-layer frame, then being secured via an assembly component passing through the inner assembly hole of the upper-layer frame and the assembly hole of the lower-layer frame, and meanwhile, an assembly component passing through the outer assembly hole of the upper-layer frame and being correspondingly secured with the short hole column inside the top shell, thereby enabling a middle-layer frame and the upper-layer frame to being securely connected with the top shell.

* * * * *